United States Patent [19]

Lang

[11] 4,438,827

[45] Mar. 27, 1984

[54] SERVO STEERING, ESPECIALLY FOR MOTOR VEHICLES

[75] Inventor: Armin Lang, Schwäbisch Gmünd, Fed. Rep. of Germany

[73] Assignee: Zahnradfabrik Friedrichshafen, AG., Friedrichshafen, Fed. Rep. of Germany

[21] Appl. No.: 381,709

[22] Filed: May 25, 1982

[30] Foreign Application Priority Data

Jun. 5, 1981 [DE] Fed. Rep. of Germany ....... 3122370

[51] Int. Cl.³ .............................................. B62D 5/08
[52] U.S. Cl. ...................................... 180/143; 91/371
[58] Field of Search ........................ 180/143, 141, 142; 91/370, 371

[56] References Cited

U.S. PATENT DOCUMENTS

| 3,922,953 | 12/1975 | Strauff | 91/371 |
| 3,927,604 | 12/1975 | Jablonsky | 91/371 |
| 4,119,172 | 10/1978 | Yanagishima et al. | 180/141 |

FOREIGN PATENT DOCUMENTS

| 2458277 | 6/1976 | Fed. Rep. of Germany | 180/141 |
| 2518337 | 11/1976 | Fed. Rep. of Germany | 180/141 |

*Primary Examiner*—John A. Pekar
*Assistant Examiner*—D. Lynn Fugate
*Attorney, Agent, or Firm*—Zalkind & Shuster

[57] ABSTRACT

A pair of fluid reaction chambers at opposite ends of a valve piston of a steering control valve are connected in series with a vehicle speed dependent control mechanism by fixed flow restrictors between the servo pump and reservoir of a servo power steering system. Check valves unidirectionally limit pressurization of the reaction chambers through which feedback forces are generated in response to displacement of the control valve.

8 Claims, 3 Drawing Figures

SERVO STEERING, ESPECIALLY FOR MOTOR VEHICLES

BACKGROUND OF THE INVENTION

This invention relates to a servo-steering system for automotive vehicles within which a vehicle speed dependent feedback force is developed to resist the manual steering effort applied, and is related to the invention disclosed and claimed in my copending application, Ser. No. 379,455 filed May 18, 1982.

Powered steering systems wherein the degree of fluid feedback developed is varied, are already known as discussed in my aforementioned copending application. As indicated in the aforementioned copending application, prior art power steering arrangements include flow controlling valve pistons which act as reaction pistons and may be unintentionally displaced as a result of malfunction. Further, any failure in the reaction or feedback pressure regulating means prevents control valve operation with any feedback characteristics.

It is therefore an object of the present invention to provide a servo-steering system with a vehicle speed controlled feedback that avoids the disadvantages of comparable prior art arrangements and wherein movement of the control valve is always constrained even in the event of failure of the regulating facilities for feedback forces.

SUMMARY OF THE INVENTION

In accordance with the present invention, a servo-steering system is provided having a feedback characteristic produced by reaction chambers connected by one of two check valves to corresponding operating chambers of the servomotor. Feedback force is varied by the regulating action of a vehicle speed responsive control mechanism having an adjustable flow restrictor. The reaction chambers are either in fluid communication with the fluid reservoir of the system or with the servo-pump. The fluid connections are established through flow restrictors maintaining operational separation between the reaction chambers, both of which are regulated in common by the vehicle speed responsive control mechanism.

BRIEF DESCRIPTION OF DRAWING FIGURES

The invention is described hereinafter in greater detail with respect to specific embodiments as shown in the accompanying drawings, wherein:

FIG. 1 schematically illustrates a servo-steering system in accordance with one embodiment of the present invention.

DETAILED DESCRIPTION OF PREFERRED EMBODIMENTS

Figure 1:
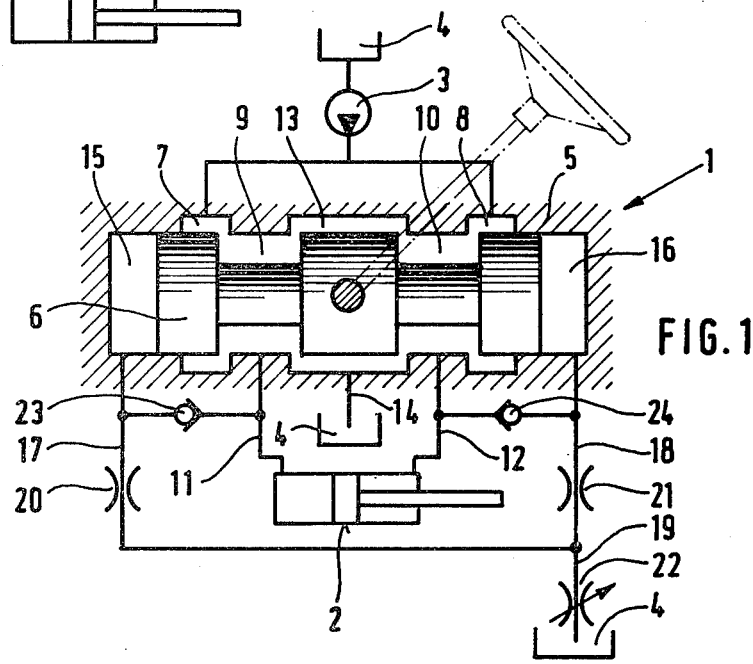

Referring now to the drawings in detail, FIG. 1 illustrates a servo-steering system in accordance with one embodiment of the invention, including a servo control valve 1 through which a pressure medium or fluid is fed to a servomotor 2 from a servo-pump 3 and returned to a reservoir 4. The servo control valve 1 includes a valve piston 6 displaceable within a valve housing 5 under a manual force exerted on a hand steering wheel shown by dotted line. The pressure fluid fed to the control valve from the servo-pump 3 enters annular grooves 7 and 8 formed in the housing about the valve piston. Two piston grooves 9 and 10 of the valve piston 6 form valve spaces in fluid communication through two outlet passages 11 and 12 with two operating chambers of the servomotor 2. A central annular valve groove 13 in the housing is in fluid communication through a return line 14 with the reservoir 4. The opposite ends of the valve piston 6 project into feedback or reaction chambers 15 or 16 formed in the housing 5 from which two passages 17 and 18 extend to a common reaction line 19. In the passages 17 and 18, fixed flow restrictors 20 and 21 are disposed operatively separating the reaction chambers 15 and 16 from each other and from the common reaction line 19. The line 19 conducts fluid through a control mechanism 22 to the reservoir 4.

The control mechanism 22 is constituted for example, by a nozzle baffle plate system as disclosed in U.S. Pat. No. 3,690,400 or as an electro-hydraulic convertor according to the disclosure in my prior U.S. Pat. No. 4,390,158. The variable flow restriction established in line 19 by the control mechanism 22 separates the reaction chambers 15 and 16 from the reservoir 4. Such variable flow restriction is established by an adjustable cross-sectional flow area in the control mechanism varied as a function of vehicle speed.

Between the reaction chambers 15 and 16 and the corresponding operating chambers of the servomotor 2, one-way check valves 23 and 24 are disposed to block flow in one direction from the reaction chambers to such servomotor chambers. The check valves may be disposed either in the valve piston 6 between the piston grooves 9 and 10 and the reaction chambers 15 and 16 or as shown in FIG. 1 between the outlet passages 11 and 12 and the reaction passages 17 and 18 from the control valve.

In the neutral position of the control valve as shown in FIG. 1, the piston grooves 9 and 10 connected to the servomotor by passages 11 and 12, are depressurized. The two check valves 23 and 24 will therefore close and the pressure in the two reaction chambers 15 and 16 will be equalized through the two restrictors 20 and 21. In response to turning of the hand steering wheel, the valve piston 6 is displaced for example to the right, causing a pressure build-up in the piston groove 10 to open check valve 24 thereby pressurizing the reaction chamber 16. Assuming that the flow restrictor of the control mechanism 22 is closed, a pressure build-up in reaction chamber 15 follows because of its fluid communication with reaction chamber 16 through restrictors 20 and 21 and the closing of check valve 23 to prevent any flow into the piston groove 9. Thus, with no flow through the control mechanism 22, no differential reaction pressure acts on the valve piston 6. Whenever full flow is conducted through the control mechanism 22 while valve piston 6 is displaced to the right, control flow is conducted through check valve 24, restrictor 21 and control mechanism 22 to the reservoir 4. Low reservoir pressure therefore prevails between the restrictor 21 and the control mechanism 22 and such low pressure is then established in the reaction chamber 15 through restrictor 20. Accordingly, the full pressure acting on the servomotor also acts as a reaction pressure on the valve piston 6. The pressure in the reaction chamber 15 is increased and the differential pressure on the valve piston 6 is decreased correspondingly in response to closing of the control mechanism 22.

Figure 2:
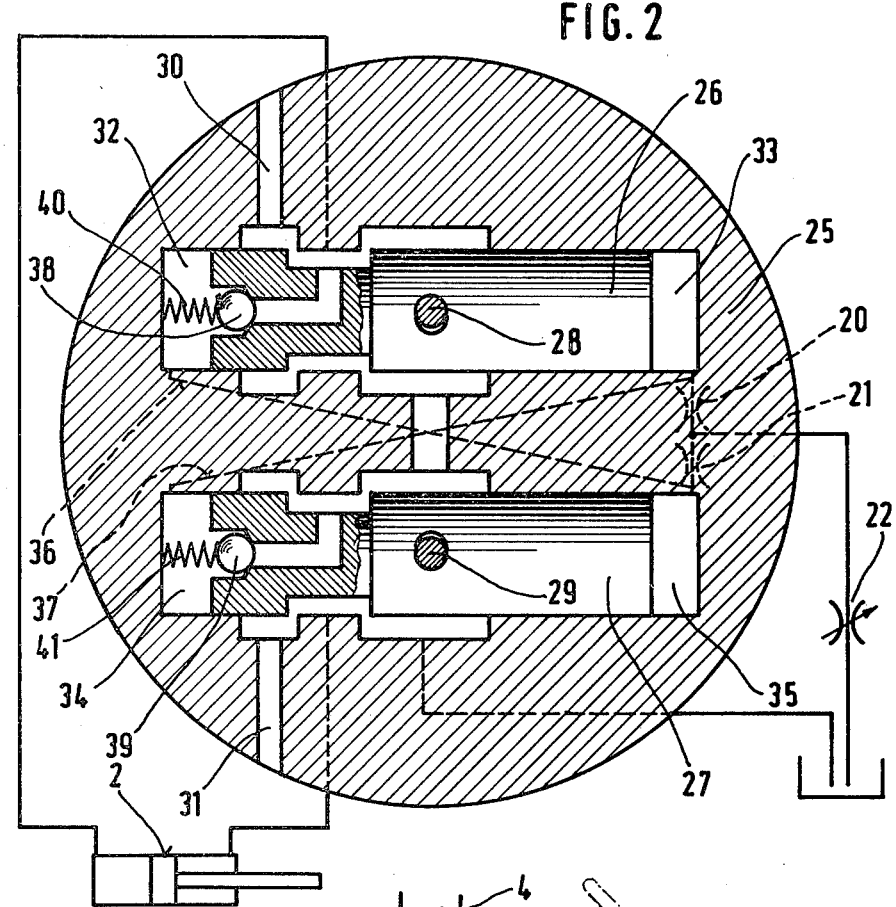
FIG. 2 illustrates another embodiment of the servo-steering system.

FIG. 2 illustrates another embodiment of the invention wherein a control valve includes a rotatable valve body 25 within which two valve pistons 26 and 27 are disposed for displacement by forces applied thereto through two drive pins 28 and 29 at the forked end of a steering spindle (not shown). Pressure fluid is fed to the control valve through inlet passages 30 and 31. At the ends of the valve pistons, reaction chambers 32, 33, 34 and 35 are formed in the valve body and are interconnected by crossing passages 36 and 37. Only one of the two chambers 32 and 34 at one end of each valve piston 26 and 27 is connected by a one-way check valve 38 and 39 with a corresponding operating chamber of the servo-motor 2. The check valves 38 and 39 are formed by ball elements seated under the bias of springs 40 and 41 reacting against the valve body 25. As a result, only a small valve opening force is required. Further, the spring forces biasing the check valves to the closed positions mutually act on the forkshaped end of the steering spindle through the drive pins 28 and 29. Fixed restrictors 20 and 21 interconnect the reaction chambers 33 and 35 with the control mechanism 22 as in the arrangement shown in FIG. 1.

The embodiment of FIG. 2 generally functions in a manner corresponding to that of FIG. 1 embodiment. However, the arrangement of a pair of reaction chambers 32 and 33 or 34 and 35 on each of the two valve pistons 26 and 27 accounts for a balanced distribution of forces applied through the two drive pins 28 and 29. Such power balance is an advantageous feature of the FIG. 2 embodiment.

Figure 3:
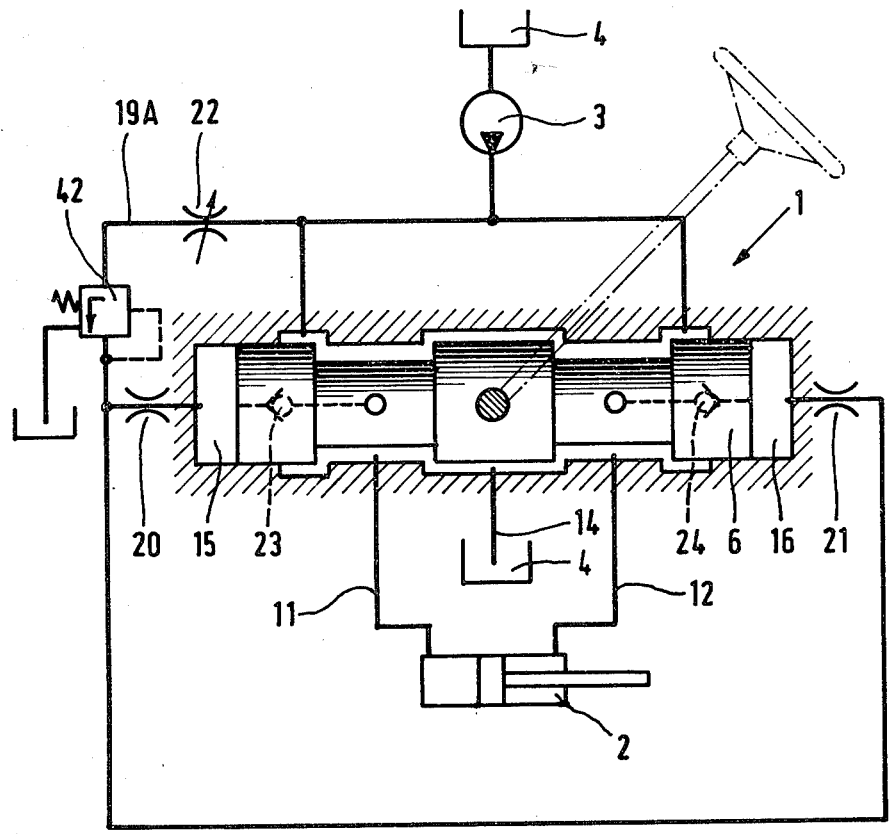
FIG. 3 illustrates a third embodiment of the servo-steering system in accordance with the present invention.

According to a third embodiment shown in FIG. 3, the control mechanism 22 is not directly connected to the reservoir 4. Instead, control mechanism 22 receives an in-flow of fluid from servo-pump 3. As a result, reaction chambers 15 and 16 are depressurized when the control mechanism 22 is closed. When opened, pressurized fluid is conducted by line 19A through a pressure reduction valve 42 and flow restrictors 20 and 21 to the reaction chambers 15 and 16. The feedback forces thereby developed are limited by the pressure reduction valve 42. The reduction valve 42 could also be inserted in line 19 between the fixed flow restrictors 20 and 21 and the control mechanism 22 in the embodiment of FIG. 1. Further, the feedback force limiting feature of the FIG. 3 embodiment could also be applied to a control valve having a pair of valve pistons as in the arrangement shown in FIG. 2. In all forms of the invention as hereinbefore described, feedback control is exercised free of the adverse effects of fluid leakage. Further, feedback forces are instantaneously generated in response to control valve displacement regardless of dimensional precision in the fabrication of the control valve.

What is claimed is:

1. In a servo power steering system for motor vehicles, including a servo motor having opposed operating chambers, a servo pump, a reservoir, a control valve through which fluid is conducted between the pump, the servo motor and the reservoir, and a control mechanism having a restricted cross-sectional flow area that is adjustable as a function of vehicle speed, said control valve having at least one movable valve piston and at least one pair of reaction chambers, the improvement comprising means mounting the valve piston (6, 26, 27) for movement in opposite steering directions, fixed flow restricting means (20, 21) for conducting fluid under pressure from the pump in series through the reaction chambers (15, 16, 32, 33, 34, 35) and the control mechanism (22) to the reservoir (4), and one-way valve means (23, 24, 38, 39) operatively mounted between the pair of reaction chambers (15, 16, 32, 34) and the servo motor (2) for unidirectionally conducting the fluid under pressure between said one pair of reaction chambers and the operating chambers of the servo motor corresponding thereto.

2. The system as defined in claim 1 wherein the control mechanism has an outlet side directly connected to the reservoir.

3. The system as defined in claim 1 wherein the fixed flow restricting means includes a pair of restrictors (20, 21) respectively connected to said one pair of the reaction chambers and means for conducting pressurized fluid from the pump separately to said one pair of the reaction chambers through the restrictors.

4. The system as defined in claim 2 wherein said valve piston (6) has opposite ends respectively subject to pressurized fluid in said one pair of reaction chambers (15, 16), the control valve further including outlet passages (11, 12) connected to the operating chambers of the servo motor, feedback passages (17, 18) connecting said one pair of reaction chambers to the reservoir, said fixed flow restricting means (20, 21) being in said feedback passages, and said one-way valve means comprising check valves (23, 24) respectively interconnecting the outlet passages with the feedback passages.

5. The system as defined in claim 1 wherein the control valve includes an additional valve piston (26, 27) and an additional pair of reaction chambers (33, 35), each of the valve pistons (26, 27) having opposite ends exposed to different pairs of the reaction chambers (32, 33, 34, 35), a pair of passages (36, 37) interconnecting the reaction chambers at opposite ends of different ones of the valve pistons.

6. The system as defined in claim 3 wherein said valve piston (6) has opposite ends respectively exposed to said one pair of reaction chambers (15, 16), the control valve further including outlet passages (11, 12) connected to the operating chambers of the servo motor (2), and feedback passages within which the fixed flow restricting means is located connecting the pump (3) to the one pair of reaction chambers.

7. The system as defined in claim 1 wherein the one-way valve means comprises a pair of check valves (23, 24, 38, 39) mounted within the valve piston (6; 26, 27).

8. The system as defined in one of claims 1 to 7 including pressure reducing means (42) connected between said control mechanism (22) and said fixed flow restricting means (20, 21) for limiting the pressure in the reaction chambers (15, 16) to a maximum value.

* * * * *